(12) United States Patent
Hegde et al.

(10) Patent No.: US 8,582,956 B1
(45) Date of Patent: Nov. 12, 2013

(54) SYSTEM AND METHOD FOR PREVIEWING MULTIMEDIA FILES

(75) Inventors: Abhishek Naveen Hegde, Noida (IN); Devendra K. Marwaha, Gbaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 1853 days.

(21) Appl. No.: 11/779,742

(22) Filed: Jul. 18, 2007

(51) Int. Cl.
*G11B 27/00* (2006.01)
*H04N 5/93* (2006.01)

(52) U.S. Cl.
USPC ............ 386/278; 386/282; 386/283; 386/285

(58) Field of Classification Search
USPC ......... 386/225, 227, 231, 278, 280, 282, 283, 386/285
See application file for complete search history.

(56) References Cited

U.S. PATENT DOCUMENTS

| | | | |
|---|---|---|---|
| 7,016,540 B1 * | 3/2006 | Gong et al. .................... | 382/225 |
| 7,313,808 B1 * | 12/2007 | Gupta et al. .................... | 725/89 |
| 7,624,337 B2 * | 11/2009 | Sull et al. ...................... | 715/201 |
| 8,019,195 B2 * | 9/2011 | Shiiyama ...................... | 386/241 |
| 2003/0219226 A1 * | 11/2003 | Newell et al. .................. | 386/69 |

* cited by examiner

*Primary Examiner* — Daquan Zhao
(74) *Attorney, Agent, or Firm* — Kilpatrick Townsend & Stockton LLP

(57) ABSTRACT

Systems and methods for previewing multimedia files associate information with a multimedia file that designates certain "frames" of the multimedia file as preview content. Such information is embedded within the multimedia file itself using, for example, tags. A media player application may, in response to a user's request to preview a selected multimedia file, determine from the associated information those frames of the multimedia file that are designated as preview content, and the media player application may then present such designated preview frames to the user as a preview. Certain embodiments further enable extended play beyond the designated preview frames, responsive to a user request for such extended play. For example, during playing of a given preview frame, a user may request extended play, wherein additional contiguous frames are appended to the preview frame(s) to provide an extended play beyond what would be presented by the pre-designated preview.

32 Claims, 6 Drawing Sheets

SYSTEM AND METHOD FOR PREVIEWING MULTIMEDIA FILES

TECHNICAL FIELD

The following description relates generally to systems and methods for previewing content of multimedia files, such as video and/or audio files.

BACKGROUND

Multimedia files are becoming increasingly popular forms of electronic files. Such multimedia files may contain such rich content as video (e.g., movies, films, etc.), and/or audio (e.g., music, songs, audio-books, etc.), as examples. The content of multimedia files may be presented to users via a media player application executing on a processor-based device, such as a personal computer (PC), laptop computer, mobile telephone, portable media player devices (e.g., iPod, etc.). Various media player applications are well known for reading multimedia files and presenting their content to a user, including as examples MICROSOFT WINDOWS MEDIA PLAYER™ developed by Microsoft Corporation, QUICKTIME™ developed by Apple computer, and REAL PLAYER™ developed by Real Networks. Also, various multimedia file formats have been developed, including as examples such well-known video compression formats as MPEG (Moving Picture Experts Group, including MPEG-1, MPEG2, and/or MPEG-4, as examples), 14.261, H.262, H.263, H.264, AVS, Bink, Dirac, Indeo, MJPEG, Real Network's RealVideo format, Theora, VC-1, VP6, VP7, .WMV (Windows Media Video), and QUICKTIME's .MOV format; and including as examples such well-known audio compression formats as MPEG-1 Layer 3 (MP3), MPEG-1 Layer 2, AAC, HE-AAC, G.711, G.722, G.722.1, G.722.2, G.723, G.723.1, G.726, G.728, G.729, G.729.1, G.729a, AC3, Apple Lossless, ATRAC, FLAC, iLBC, Monkey's Audio, μ-law, Musepack, Nellymoser, Real Network's RealAudio format, SHN, Speex, Vorbis, WayPack, WMA, and TAK. Further, in some instances, the multimedia file may be implemented using a media container format such as one of the well-known media container formats of 3GP, ASF, AVI (Audio Video Interleave), DMF, DPX, FLV, Matroska, MP4, MXF, NUT, Ogg, Ogg Media, QuickTime, RealMedia, VOB, AIFF, AU, and WAV.

Often, a user may desire to preview content of a multimedia file. For instance, a user may desire to preview content of a given multimedia file in order to determine whether the user desires to obtain (e.g., purchase, download, etc.) the multimedia file, play the multimedia file, and/or take some other action regarding the multimedia file (e.g., store to a portable player for later access by the user, etc.). As an example, a user may have access to many movie files, and the user may desire to view previews of certain ones of the movie files to determine one or more of the movie files that the user desires to perform some action on, such as watch the movie, store the movie file to a portable player for later viewing, etc.

Traditionally, such preview capability has been undesirably limited. In some instances, a separate preview file may be created for a multimedia file. For instance, movie trailers are often created as advertisements for a corresponding movie, wherein such a movie trailer normally includes a series of selected shots/frames from the movie being advertised. Since the purpose of the trailer generally is to attract an audience to the film, these excerpts are usually drawn from the most exciting, funny, or otherwise noteworthy parts of the film, but in abbreviated form. Some trailers use special shoot footage, which is material that has been created specifically for advertising purposes and does not appear in the actual movie. Such a movie trailer file may be created and available for access/viewing by a user.

However, such use of separate preview files is often not an optimal solution. One drawback to such use of separate preview files is that the separate preview files require additional storage space for storing such preview files in addition to storing the corresponding actual multimedia file (e.g., movie, etc.). Also, complexity associated with managing storage of such separate preview files may arise. Additionally, difficulty may arise in a user identifying a corresponding multimedia file for a given preview file. That is, in the event that a user views a preview file and determines based on such preview file that the user desires to take some action on the actual multimedia file that he/she has previewed (e.g., the full movie file, etc.), the user may have difficulty identifying and/or finding the separate corresponding multimedia file in order to take the desired action. The management of the user interface for aiding a user in identifying the multimedia file that corresponds to a separate preview file may become undesirably complex. Finally, the given preview file contains fixed content and does not allow the user to request presentation of additional portions of the corresponding multimedia file. Instead, the user is restricted to merely being presented the pre-defined content that is contained in the separate preview file.

Another technique that may be employed by users for attempting to preview a multimedia file is through the use of a seek slider, fast forward, rewind, or other playback controls of a media player application. For instance, during playback of a movie, many media player applications enable a user to jump to different portions of the movie through use of a seek slider, fast forward, rewind, or other playback control interface. However, such jumping around through a multimedia file (e.g., movie) being presented to a user often may fail to provide the user with a useful/valuable experience. For instance, the user may jump to portions of a movie that fail to provide the user with good preview information from which the user can sufficiently appreciate the content of the movie. For example, many movies include portions during which actors are singing, and if a user continuously jumps to portions of the movie at which such a song is being presented, the user may not obtain a good preview from which the user can understand/appreciate what the movie is about. Thus, such jumping technique undesirably relies upon the user's ability for jumping through a multimedia file being presented in order to generate some type of preview, and the technique produces undesirably random results with regards to the quality of preview that may be obtained by a given user.

Accordingly, a desire exists for improved techniques for previewing multimedia files.

BRIEF SUMMARY

The present invention is directed generally to systems and methods for previewing multimedia files. According to certain embodiments of the present invention, information is associated with a multimedia file that designates certain "frames" of the multimedia file as preview content. Various embodiments are provided that provide systems and methods for designating such frames of a multimedia file's content as preview content. That is, certain embodiments of the present invention are directed to defining (e.g., within a multimedia file) content of a multimedia file that is preview content. Information that designates preview frames of a multimedia file may be associated with the multimedia file in any number of different ways. In certain embodiments, such information is embedded within the multimedia file itself. For instance, tags may be inserted into the frames (e.g., included within the header information of the frames) to designate such frames as preview frames. A media player application may, in response to a user's request to preview a selected multimedia file, determine (e.g., from the associated information, such as tags, that designates the preview frames of the multimedia file) those frames of the multimedia file that are designated as preview content, and the media player application may then present such designated preview frames to the user as a preview of the multimedia file.

As used herein, a "frame" generally refers to a discrete portion (e.g., a single sampling) of a multimedia file's content, wherein a plurality of such frames may be presented in a sequence to form the multimedia file's full content. While the term "frame" is commonly used in reference to video content, usage of the term "frame" herein is not limited to video content but is instead used more generally to refer to discrete portions of any type of multimedia file content, whether video content and/or audio content. The terms "video frames" and "audio frames" are used herein to designate frames of the respective types of content. Thus, a plurality of video frames may be included in a multimedia file to form the video content of such file (e.g., wherein such content may be in an MPEG or other video compression format). Similarly, a plurality of audio frames may be included in a multimedia file to for audio content of such file (e.g., wherein such content may be in an MP3 or other audio compression format).

Video frames are one example of "frames" that are well known in the art. In video (e.g., film, movie, animation, etc.), a video frame is one of the many still images which compose the complete moving picture. When the moving picture is displayed, each frame is flashed on a screen for a short time (e.g., typically ¹⁄₂₄th, ¹⁄₂₅th or ¹⁄₃₀th of a second) and then immediately replaced by the next one. Persistence of vision blends the frames together, producing the illusion of a moving image. Another example of "frames", as used herein, is "audio frames" which refer to a discrete portion (e.g., a single sampling) of audio content contained in a multimedia file. For instance, an audio frame may correspond to the bit depth (or sampling rate) of the audio. For example, bit depth generally describes the amount of data contained in each sample, wherein common examples of bit depth include CD audio, which is recorded at 16 bits, and DVD-Audio which can support up to 24-bit audio. Thus, in the case of employing a bit depth-based "audio frame", each audio frame may correspond to 16 bits of audio data for a 16-bit sampling (e.g., CD audio), etc. Of course, other discrete portions of a digital audio file may be used as "audio frames" in other embodiments.

Further, according to certain embodiments of the present invention, extended play of a preview is supported. That is, according to certain embodiments, while preview frames of a multimedia file are being presented on a media player application, a user may request an extended play of the multimedia file's content, and in response to such request, additional frames of the multimedia file beyond those frames designated as preview frames may be presented to the user. As one example, a request for extended play may be detected during the presentation of a certain contiguous group of preview frames of a multimedia file, and some number of additional contiguous frames may be appended to the end of such group of contiguous frames, so as to provide an extended play of that portion of the multimedia file's content. In certain embodiments, in response to a user clicking on a given preview frame, an extended play may begin at such given preview frame and play for some amount going forward (e.g., play an additional number of contiguous frames, play for a certain amount of additional time, etc.), wherein the extended play may include frames beyond those that are designated as preview frames.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
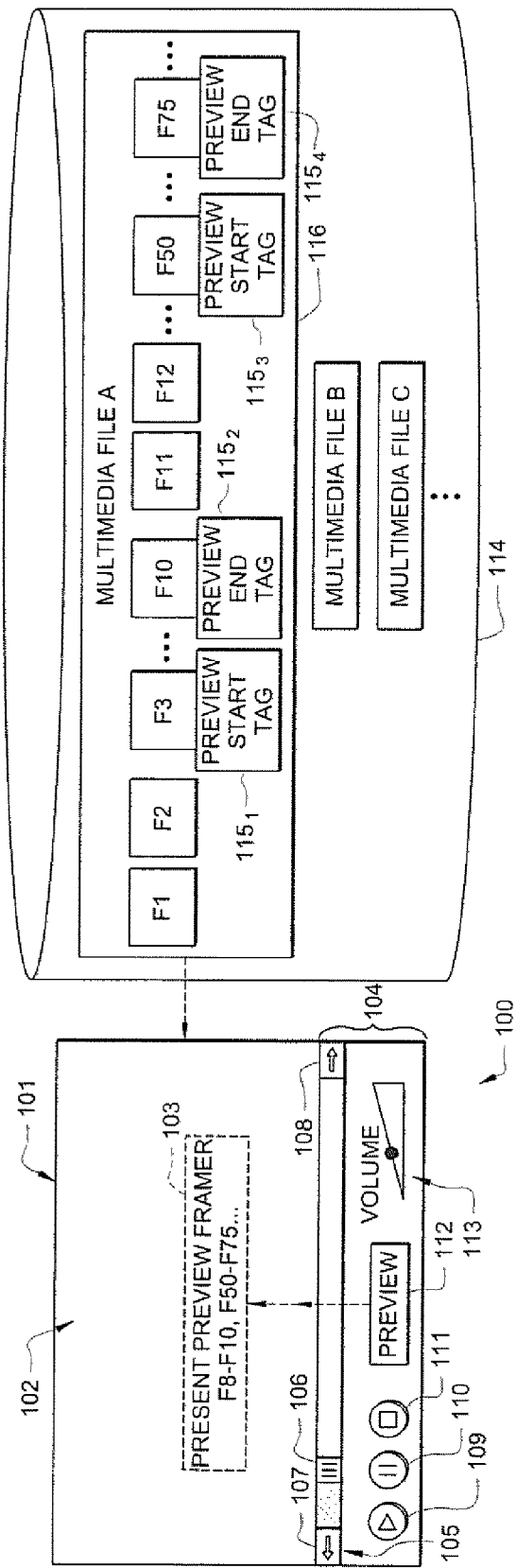
FIG. 1 shows an exemplary system according to one embodiment of the present invention.

FIG. 1 shows an exemplary system 100 according to one embodiment of the present invention. System 100 comprises data storage 114 to which one or more multimedia files may be stored. Data storage 114 comprises a computer-readable medium, such as memory, hard drive, peripheral data storage drive, optical data storage (e.g., CD, DVD, etc.), magnetic data storage, tape storage, etc., to which digital multimedia files may be stored. In the illustrated example, multimedia files A-C are stored to data storage 114. Of course, any number of such multimedia files may be stored to data storage 114 in a given implementation. According to certain embodiments of the present invention, a multimedia file may have information associated therewith that identifies certain portions (e.g., frames) of the multimedia file's content as preview content. Such preview capability may be desirable to a user, particularly as the number of multimedia files accessible by the user (e.g., stored to data storage 114) increases, to enable the user to briefly preview content of a given multimedia file to determine whether such multimedia file is a file of interest to the user.

According to certain embodiments of the present invention, information is associated with a multimedia file that designates certain "frames" of the multimedia file's content as preview content. As used herein, a "frame" generally refers to a discrete portion (e.g., a single sampling) of a multimedia file's content, wherein a plurality of such frames may be presented in a sequence to form the multimedia file's full content. While the term "frame" is commonly used in reference to video content, usage of the term "frame" herein is not limited to video content but is instead used more generally to refer to discrete portions of any type of multimedia file content, whether video content and/or audio content. The terms "video frames" and "audio frames" are used herein to designate frames of the respective types of content. Thus, a plurality of video frames may be included in a multimedia file to form the video content of such file (e.g., wherein such content may be in an MPEG or other video compression format). Similarly, a plurality of audio frames may be included in a multimedia file to form audio content of such file (e.g., wherein such content may be in an MP3 or other audio compression format).

Video frames are one example of "frames" that are well known in the art. In video (e.g., film, movie, animation, etc.), a video frame is one of the many still images which compose the complete moving picture. When the moving picture is displayed, each frame is flashed on a screen for a short time (e.g., typically $\frac{1}{24}$th, $\frac{1}{25}$th or $\frac{1}{30}$th of a second) and then immediately replaced by the next one. Persistence of vision blends the frames together, producing the illusion of a moving image. Another example of "frames", as used herein, is "audio frames" which refer to a discrete portion (e.g., a single sampling) of audio content contained in a multimedia file. For instance, an audio frame may correspond to the bit depth (or sampling rate) of the audio. For example, bit depth generally describes the amount of data contained in each sample, wherein common examples of bit depth include CD audio, which is recorded at 16 bits, and DVD-Audio which can support up to 24-bit audio. Thus, in the case of employing a bit depth-based "audio frame", each audio frame may correspond to 16 bits of audio data for a 16-bit sampling (e.g., CD audio), etc. Of course, other discrete portions of a digital audio file may be used as "audio frames" in other embodiments.

According to certain embodiments of the present invention, information is associated with frames of a multimedia file to designate which frames are preview content for the multimedia file. For instance, exemplary multimedia file A is shown in detail in FIG. 1, which contains various frames, including frames F1-F75. Information is associated with multimedia file A to identify certain ones of frames F1-F75 as preview content for multimedia file A. In certain embodiments, tags (which may be referred to herein as "preview" tags) are included within the multimedia file for identifying the frames of the multimedia file as forming preview content. Such tags may be implemented within the file at the file level (e.g., within a header or other information of the multimedia file) or within individual frames at the frame level, as examples. As used herein, tags refer generally to any information that is included in a multimedia file for identifying frames of the multimedia file as preview frames. In the illustrated example of FIG. 1, tags are associated with the frames F1-F75 to identify those frames that form preview content.

For instance, a preview start tag $115_1$ associated with frame F3 and preview end tag $115_2$ associated with frame F10 identify frames F3-F10 as preview content. Similarly, preview start tag $115_3$ associated with frame F50 and preview end tag $115_4$ associated with frame F75 identify frames F50-F75 as further preview content, Accordingly, the tags $115_1$-$115_4$ identify frames F3-F10 and F50-F75 of multimedia file A as preview content of such multimedia file A.

As described further herein, information that designates preview frames of a multimedia file may be associated with the multimedia file in any number of different ways. In certain embodiments, such information is embedded within the multimedia file itself. For instance, tags may be inserted into the frames (e.g., included within the header information of the frames) to designate such frames as preview frames. Also, while start and end tags are shown in this example, in other embodiments, a tag may be associated with each individual frame that is to be part of the preview content, rather than a mere start and end tag. Further still, while tags are shown in this example, any information may be associated with the multimedia file (e.g., included in the file itself as meta information for the file, included in individual frames of the file, etc., or external to the multimedia file and otherwise associated therewith (e.g., linked information)).

System 100 also comprises a media player application 101 that is executing on a processor-based device, such as a PC, laptop, server, mobile telephone, portable media player device, etc. The media player application 101 can read a multimedia file, such as multimedia files A-C stored to data storage 114, and present the multimedia file's content (e.g., video and/or audio) to a user. Such media player application 101 may present a display 102 on which multimedia file content can be presented to a user. For instance, video content of a multimedia file may be displayed on display 102. Further, a user interface providing various playback controls 104 may be included on media player application 101 with which a user can interact to control the playback of a multimedia file.

In the illustrated example, such playback controls 104 include seek slider 105 with which a user can interact to change a point within a multimedia file that is being presented. For instance, a user may fast forward the playback by activating button 108, or rewind playback by activating button 107. Further, slider bar 106 indicates the playback progress of the multimedia file being presented, and the user may move the slider bar 106 to jump to a corresponding portion of the multimedia file's playback.

The exemplary illustrated playback controls 104 further include play button 109, pause button 110, and stop button 111, with which a user may interact to initiate playing of a multimedia file, pausing of the file, and stopping the file presentation, respectively. Playback controls 104 also include volume control 113 with which a user may interact to change the volume of audio being presented by a multimedia file.

According to certain embodiments of the present invention, a preview interface (e.g., button, etc.) 112 is also provided with which a user may interact to request a preview of a selected multimedia file, as discussed further herein. According to this exemplary embodiment, when a user activates preview interface 112, media player application 101 is operable to read a selected multimedia file and determine from the associated information that identifies the preview content (e.g., tags $115_1$-$115_4$ of multimedia file A) a portion of the selected multimedia file to present as a preview. Media player application 101 may then present such determined portion as a preview of the selected multimedia file to the user. For instance, in the illustrated example of FIG. 1, a user has selected multimedia file A and activates preview interface 112

(e.g., by clicking the interface). In response, media player application 101 reads multimedia file A and determines, from preview tags $115_1$-$115_4$, that frames F3-F10 and F50-F75 are preview content of such multimedia file A. Accordingly, as shown in operational block 103, media player application 101 presents the determined frames F3-F10 and F50-F75 as a preview to the user.

Figure 2:
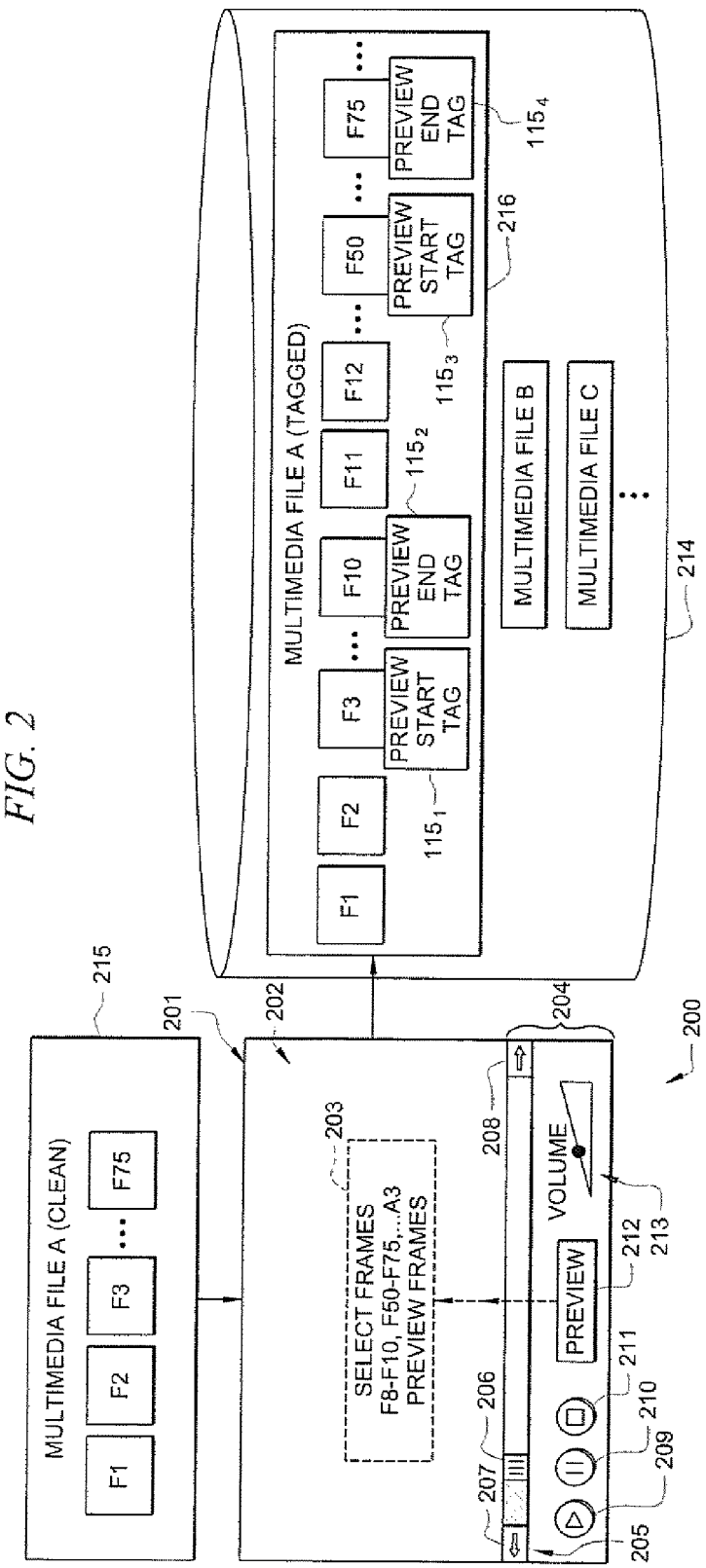
FIG. 2 shows an exemplary system according to one embodiment of the present invention.

According to certain embodiments of the present invention, a tool (e.g., an editing tool) is provided to aid a user (e.g., multimedia file provider) in associating information with a multimedia file to identify preview content of the multimedia file. For instance, FIG. 2 shows an exemplary system 200 according to one embodiment of the present invention. System 200 comprises an exemplary editing tool 201, which is implemented as a software application that is executing on a processor-based device, such as a PC, laptop, server, mobile telephone, portable media player device, etc. Editing tool 201 receives as input multimedia file A (labeled 215). Such received multimedia file A 215 is a "clean" multimedia file that does not have information associated therewith that designates preview content of the multimedia file A. Editing tool 201 presents the received multimedia file's content (e.g., video and/or audio) to a user, and enables the user to specify selected frames of the multimedia file as preview frames.

Editing tool 201 is, in certain embodiments, operable to decompress the content of a received media file into frames, and then enable a user to edit the frame data to specify preview frames (as discussed further herein). Editing tool 201 may present the received multimedia file's content to the user in any number of ways to enable the user to edit such multimedia file. For example, editing tool 201 may provide a user interface similar to any multimedia file editing environment now known or later developed for enabling users to create and/or edit multimedia files, wherein editing tool 201 enables a user to specify frames of a multimedia file to be tagged as preview frames, and the editing tool 201, responsive to such specification, edits the multimedia file to include such preview frame tags. That is, various editing tools for creating and/or editing multimedia files are well-known, and any interface such as those employed by such well-known editing tools for presenting and supporting editing of a multimedia file may likewise be employed by editing tool 201 in certain embodiments.

As one exemplary interface, editing tool 201 may present an interface similar to an output interface of a multimedia player application. For instance, in the illustrated example of FIG. 2, editing tool 201 presents a display 202 on which content of multimedia file A 215 can be presented to a user. For example, video content of multimedia file A 215 may be displayed on display 202. Further, the editing tool's user interface may provide various playback controls 204 with which a user can interact to navigate through (e.g., control playback of) the received multimedia file A 215. In the illustrated example, such playback controls 204 include seek slider 205 with which a user can interact to change a point within a multimedia file that is being presented. For instance, a user may fast forward the playback by activating button 208, or rewind playback by activating button 207. Further, slider bar 206 indicates the playback progress of the multimedia file being presented, and the user may move the slider bar 206 to jump to a corresponding portion of the multimedia file's playback. The exemplary illustrated playback controls 204 further include play button 209, pause button 210, and stop button 211, with which a user may interact to initiate playing of a multimedia file, pausing of the file, and stopping the file presentation, respectively. Playback controls 204 also include volume control 213 with which a user may interact to change the volume of audio being presented by a multimedia file. Any number of other navigation tools to enable a user to navigate through a received multimedia file for determining and selecting frames of the received multimedia file as preview frames may be included in addition to or instead of the exemplary navigation controls shown in the illustrated editing tool interface of FIG. 2. For instance, various editing tools for creating and/or editing multimedia files are well-known, and any navigation tools such as those employed by such well-known editing tools for navigating through a multimedia file may likewise be employed by editing tool 201 in certain embodiments.

According to certain embodiments of the present invention, editing tool 201 includes an interface (e.g., button, etc.) 212 for selecting frames of received multimedia file A 215 to be designated as preview frames. In the illustrated example, a user utilizes interface 212 to select frames F3-F10, F50-F75, ..., as preview frames in operational block 203. For instance, as frames of received multimedia file A 215 are presented on display 202, a user may activate (e.g., click on) interface 212 when frames are presented that a user desires to designate as preview content. Of course, while FIG. 2 shows one exemplary user interface with which a user may interact to select preview frames of a received multimedia file A 215, other suitable user interfaces for so selecting such preview frames may be provided by tool 201 in other embodiments.

As a result of selecting the frames to be designated as preview frames, tool 201 outputs multimedia file A (labeled 216) which contains information (e.g., tags) that designate the preview frames. For instance, in this example, the generated multimedia file A contains preview tags $115_1$-$115_4$ that designate frames F3-F10 and F50-F75 as preview content of such multimedia file A. Such output multimedia file A 216 may be stored to data storage 214.

According to certain embodiments, every frame that is present in a multimedia file has the facility to store information as header information. In certain embodiments, a new tag (e.g., a "preview" tag) is inserted in the header information of a frame to designate such frame as a preview frame. In certain embodiments, all the frames that are to be designated as being part of a preview include such a preview frame header. In other embodiments, a start preview tag and end preview tag may be used to designate a number of contiguous frames that are to be included as preview content, such as shown above in FIGS. 1-2 for multimedia file A. Further, in certain embodiments, such tag information may be included at the file level of the multimedia file, rather than at the individual frame level. For instance, the tag information may be included in the header information of the multimedia file.

According to certain embodiments, when a user chooses to receive a preview of a multimedia file (e.g., by selecting preview interface 112 of exemplary media player application 101 of FIG. 1), a media player application 101 parses the selected multimedia file to be previewed and plays back all the frames that are designated as preview frames (e.g., that include header information designating them as preview frames).

Figure 3:
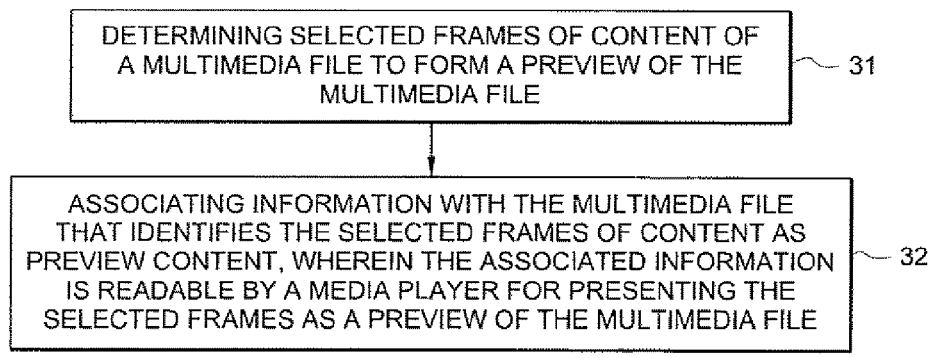
FIG. 3 shows an exemplary operational flow diagram according to one embodiment of the present invention.

FIG. 3 shows an exemplary operational flow diagram according to one embodiment of the present invention. In operational block 31, selected frames of content of a multimedia file that form a preview of the multimedia file are determined. For instance, as discussed above, an editor may utilize an interface (e.g., interface 212) of an editing tool 201 to designate the selected frames of content of a multimedia file that are desired to be preview frames. In operational block 32, information is associated with the multimedia file that identifies the selected frames of content as preview content, wherein the associated information is readable by a media player application for presenting the selected frames as a preview of the multimedia file. For instance, as discussed above with FIG. 1, tags may be inserted into the multimedia file that designate the preview frames, wherein a media player application can determine from such tags the preview frames to present when a user desires to be presented a preview of the multimedia file.

Figure 4:
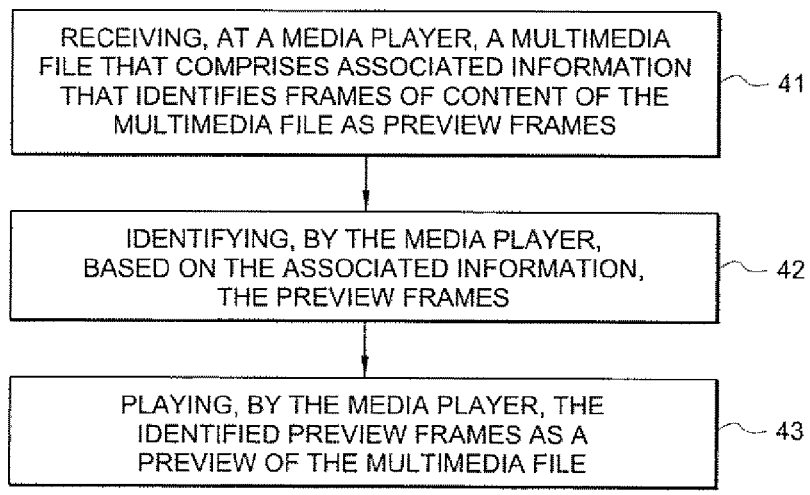
FIG. 4 shows another exemplary operational flow diagram according to an embodiment of the present invention.

FIG. 4 shows another exemplary operational flow diagram according to an embodiment of the present invention. In operational block 41, a media player (e.g., media player application 101 of FIG. 1) receives a multimedia file that comprises associated information that identifies frames of content of the multimedia file as preview frames. For instance, in the example of FIG. 1, media player application 101 receives a multimedia file A that comprises tags $115_1$-$115_4$ that identifies frames F3-F10 and F50-F75 as preview frames. In operational block 42, the media player identifies, based on the associated information (e.g., tags $115_1$-$115_4$ of FIG. 1), the preview frames (e.g., preview frames F3-F10 and F50-F75 of multimedia file A in the example of FIG. 1). In operational block 43, the media player plays the identified preview frames as a preview of the multimedia file. For instance, in the example of FIG. 1, media player application 101 presents, in operational block 103, the identified preview frames F3-F10 and F50-F75 of multimedia file A.

Figure 5:
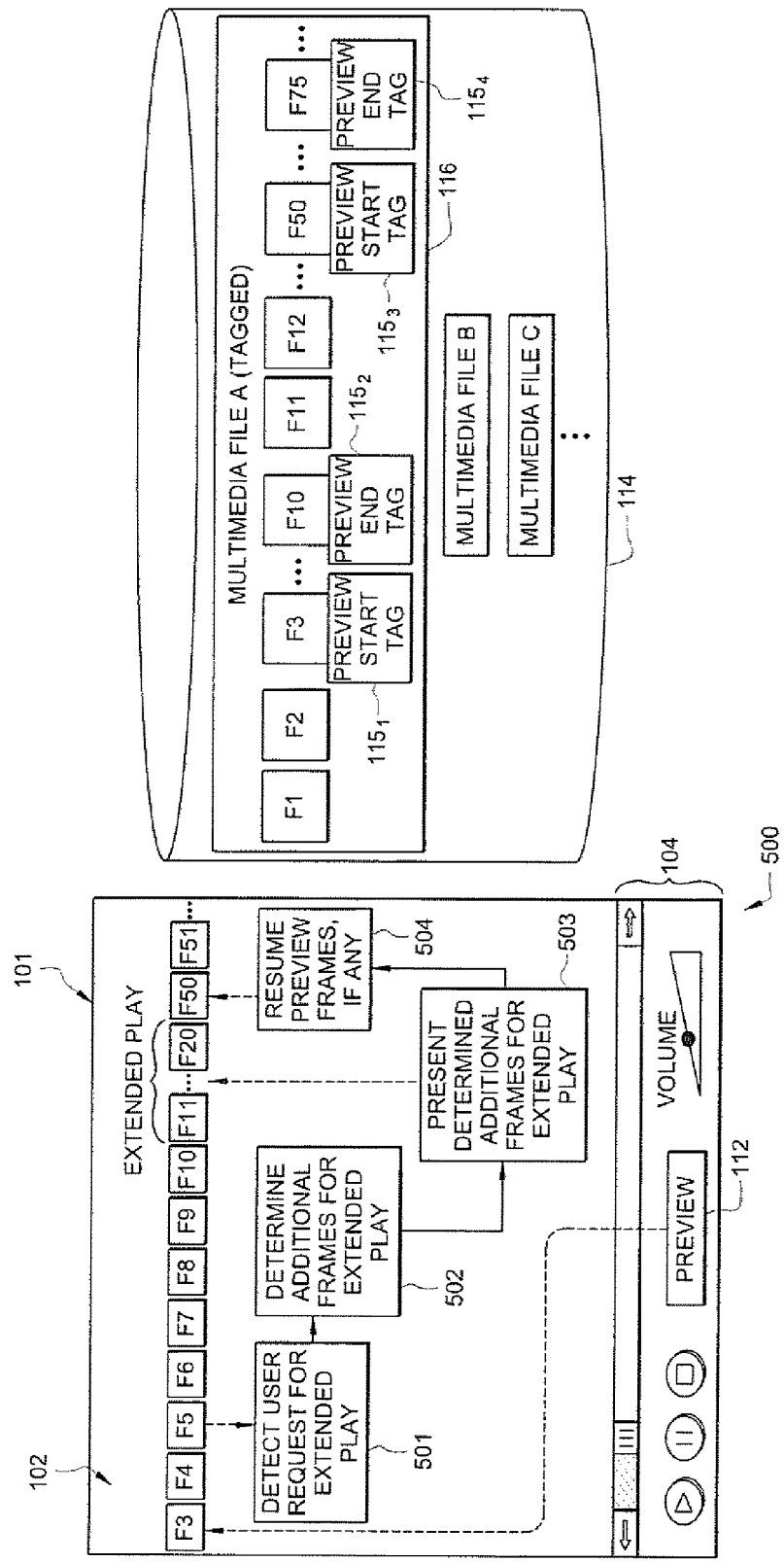
FIG. 5 shows an exemplary system according to one embodiment of the present invention, which supports extended play of preview Content of a multimedia file.

According to certain embodiments of the present invention, extended play of a preview is supported. That is, according to certain embodiments, while preview frames of a multimedia file are being presented on a media player application, a user may request an extended play of the multimedia file's content, and in response to such request, additional frames of the multimedia file beyond those frames designated as preview frames may be presented to the user. FIG. 5 shows an exemplary system 500 according to one embodiment of the present invention, which supports extended play of preview content of a multimedia file. As with system 100 of FIG. 1 discussed above, system 500 comprises data storage 114 to which one or more multimedia files are stored, such as multimedia file A. As discussed with FIG. 1 above, information is associated with multimedia file A to identify certain ones of frames F1-F75 as preview content for multimedia file A. In the illustrated example, tags are associated with certain ones of the frames F1-F75 to identify those frames that form preview content. For instance, the tags $115_1$-$115_4$ identify frames F3-F10 and F50-F75 of multimedia file A as preview content of such multimedia file A. As also discussed with FIG. 1 above, system 500 also comprises a media player application 101 that is executing on a processor-based device, such as a PC, laptop, server, mobile telephone, portable media player device, etc. The media player application 101 can read a multimedia file, such as multimedia files A-C stored to data storage 114, and present the multimedia file's content (e.g., video and/or audio) to a user.

Also, as discussed above with FIG. 1, a preview interface (e.g., button, etc.) 112 is also provided with which a user may interact to request a preview of a selected multimedia file, as discussed further herein. According to this exemplary embodiment, when a user activates preview interface 112, media player application 101 is operable to read a selected multimedia file and determine from the associated information that identifies the preview content (e.g., tags $115_1$-$115_4$ of multimedia file A) a portion of the selected multimedia file to present as a preview. For instance, in the illustrated example of FIG. 5, a user has selected multimedia file A and activates preview interface 112 (e.g., by clicking the interface). In response, media player application 101 reads multimedia file A and determines, from preview tags $115_1$-$115_4$, that frames F3-F10 and F50-F75 are preview content of such multimedia file A. Accordingly, the media player application 101 begins playing the preview frames, starting with preview frame F3, as shown.

In the example of FIG. 5, media player application 101 is operable to detect a user request for extended play. Such a user request for extended play may be input in a variety of different ways. For instance, a user may, in certain embodiments, click the display 102 with a pointing device (e.g., mouse), which may automatically trigger extended play and/or may present the user with an option (e.g., menu) to select extended play. As another example, a user interface button (not shown), similar to the preview button 112, may be included for requesting such extended play. In the illustrated example of FIG. 5, media player application 101 detects a user request for extended play during preview frame F5, as shown in operational block 501. In response, media player application 101 determines, in operational block 502, a number of additional frames beyond the designated preview frames to be presented. In this example, the request for extended play is detected during the presentation of the first contiguous group of preview frames, F3-F10. Thus, some number of additional contiguous frames may be appended to the end of such first group of contiguous frames, so as to provide an extended play of that portion of the multimedia file's content. The number of additional contiguous frames to be appended may be determined in any number of ways. As one example, media player application 101 may be configured to present a predefined number of additional frames (e.g., a number that corresponds to an additional amount of time, such as additional 10 seconds of playback time) whenever such a request for extended play is detected. Such additional number of frames may be determined as some number of frames to be added to the end of the one or more contiguous preview frames (e.g., frames F3-F10) in which the frame that the user clicked on to request extended play is included, or the additional number of frames may be determined from the as some number of frames to be added to the frame on which the user clicked to request the extended play.

For example, in operational block 501 of FIG. 5, the media player application detects a user request for extended play during preview frame F5. In certain embodiments, an extended play may begin by presenting some number of additional contiguous frames continuing with the next frame, F6, and going forward. For example, an additional number of contiguous frames, say 20 frames, may be presented as an extended play from frame F5, thus extending the play out to frame F25 in this example. In certain implementations, the extended play may be updated if a further request for extended play is received. For instance, suppose that after receipt of a user request for extended play being received during frame F5 (which results in determination of an extended play to frame F25 in the previous example), another request for extended play is received during preview frame F8; in certain implementations, the previously determined extended play is updated in response to the additional extended play request to extend play to frame F28. In certain embodiments, the additional number of contiguous frames, say 20 frames, may be appended to the end of the contiguous preview frames F3-F10 during which the request for extended play is received, thus extending the play out to frame F30.

As another example, information (e.g., tags) may be included in the multimedia file itself to designate a permitted number of additional frames to be presented in response to a detected extended play. In such an implementation, an extended play tag may be associated with the first group of designated contiguous preview frames, F3-F10, which may specify a permitted number of additional frames to be appended to frame F10 (or to be appended to a preview frame being presented when the request for extended play is received, such as frame F5 in the above-mentioned example) in the event of a request for extended play. For example, such an extended play tag may specify that additional frames F11-F20 are to be appended to frame F10 for extended playback in the event that extended playback of the first group of contiguous playback frames, F3-F10, is requested. Similarly, an extended play tag may be associated with the second group of designated contiguous preview frames, F50-F75, which may specify a permitted number of additional frames to be appended to frame F75 in the event of a request for extended play. For example, such an extended play tag may specify that additional frames F76-F100 are to be appended to frame F75 for extended playback in the event that extended playback of the second group of contiguous playback frames, F50-F75, is requested. It should be noted that in this manner, this exemplary implementation enables a content provider to control how much extended play, if any, if permitted for each portion of the preview content that is being presented, and the same number of additional frames need not be added for each of the contiguous groups of frames that are included as preview frames. Upon a request for extended play being detected in operational block 501, media player application 101 may, in this exemplary implementation, determine from the tags associated with the corresponding contiguous group of preview frames being presented how many additional frames, if any, are to be appended to the end of such contiguous group of preview frames (e.g., appended to the end of the frame designated with the preview end tag 115$_2$) for extended play of that portion of the preview content.

Once the number of additional frames to append to the first group of contiguous preview frames is determined in block 502, such determined additional frames are presented for extended play, as shown in operational block 503. Thus, in this example, additional frames F11-F20 are appended to the first group of contiguous preview frames, F3-F10, in response to the detected request for extended play of that portion of the preview. Once the extended play of the first group of contiguous preview frames is presented (i.e., once frames F11-F20 have been presented), the media player application 101 resumes presenting any remaining preview frames that are designated for the multimedia file A, and thus in the illustrated example, resumes (shown as operational block 504) playing the next designated portion of contiguous preview frames, frames F50-F75. A user's request for extended may similarly be detected and handled in the above-described manner for the second group of contiguous preview frames, F50-F75. In certain embodiments, media player 101 may support receipt of a user's request for extended play of all of the contiguous groups of preview frames, rather than making such a request individually during playing of each contiguous group, and any such embodiment is intended to be within the scope of the present invention.

According to one exemplary embodiment, when a user clicks on display 102 while any of the preview frames are being presented by a media player application, the preview frame being presented when the click is detected is used as a reference frame. The media player application then plays the multimedia content from the reference preview frame for a time period of N seconds. The time N seconds may be fixed, say at approximately 20 seconds, or it may vary depending, for example, on header information included for the reference frame (e.g., header information for each preview frame may designate an additional amount of extended play that is permitted from such frame). Once the N seconds are over, the media player application returns to the next preview frame from the frame which had been clicked and continues playing the preview.

Figure 6:
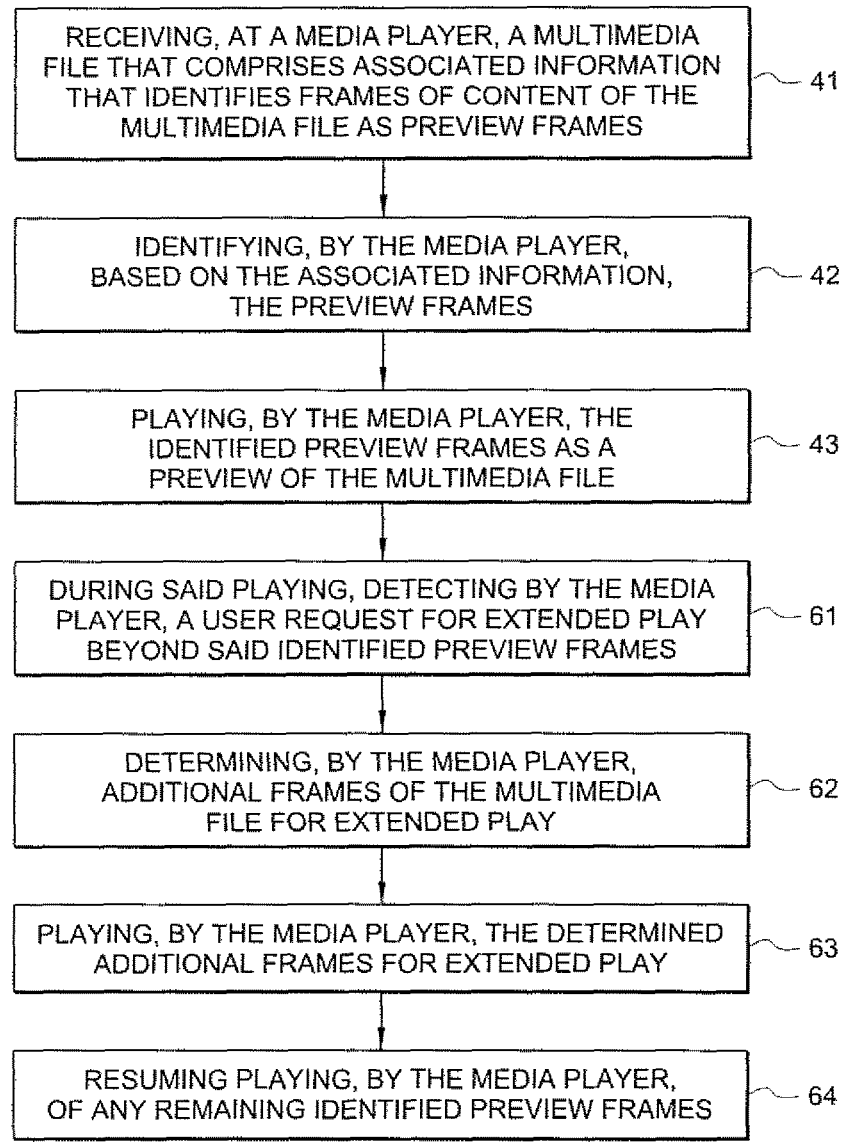
FIG. 6 shows another exemplary operational flow diagram according to an embodiment of the present invention.

Turning now to FIG. 6, another exemplary operational flow diagram according to an embodiment of the present invention is shown. As with FIG. 4, operational blocks 41-43 are again included in which a media player receives a multimedia file, identifies the preview frames, and plays the identified preview frames as a preview of the multimedia file. Further, in this exemplary embodiment, the media player detects in operational block 61, during the playing of the preview frames, a user request for extended play beyond the identified preview frames. In operational block 62, the media player determines additional frames of the multimedia file to be presented for extended play, and in operational block 63, the media player plays the determined additional frames for extended play. Then, in operational block 64, the media player resumes playing of any remaining identified preview frames. That is, in operational block 64, the media play may identify the next preview frame that follows the end of the extended play (i.e., after the last frame of the extended play), and continues the preview with such identified next preview frame. For instance, in the example of FIG. 5, if in response to the user requesting extended play during frame F5, play may be extended to append contiguous frames F11-F25 on to preview frame F10, such that following frame F5 preview frames F6-F10 are played followed by extended play frames F11-F25. Then, at the end of such extended play, the next preview frame, following frame F25, may be identified which in this example is frame F50, and the media player thus continues presenting the preview of multimedia file A with preview frame F50.

Suppose now that the extended play requested during frame F5 caused an extended play to frame F54, which is within the contiguous group of preview frames F50-F75; in certain embodiments, the media player recognizes that such extended play ended within a contiguous group of predefined preview frames, and will thus continue at the end of the extended play (i.e., after frame F54 in this example) with the next preview frame following such extended play, which in this example is frame F55. As such, in this example the media player may, after playing the last the extended play frame, F54, continue its preview play with the next predefined preview frame(s), which in this case is F55-F75.

Suppose now that the extended play requested during frame F5 caused an extended play to frame F76, thus passing the predefined contiguous group of preview frames F50-F75; in certain embodiments, the media player recognizes that such extended play passed the predefined contiguous group of preview frames F50-F75, and will thus continue at the end of the extended play (i.e., after frame F76 in this example) with the next preview frame following such extended play, i.e., the next predefined preview frame following frame F76 at which the extended play ended.

In view of the above, according to certain embodiments of the present invention, an editing tool (e.g., editing tool 201 of FIG. 2) is provided that is operable to generate a dynamically linked preview for a multimedia file (e.g., movie file, etc.) by using the frames of content in the file. Further, extended play of a preview may be supported in certain embodiments. For instance, when the user clicks on any of the frames during preview playback, the media player application (e.g., media player application 101 of FIG. 5) may further play part of the multimedia file's content beyond the predefined preview frames (e.g., some additional frames added to the frame on which the user clicked or added to the end of that contiguous group of preview frames or for a certain duration of time (N seconds)), and then return to playing the preview from the next predefined preview frame following the end of the extended play.

According to certain embodiments, the content for the dynamically linked preview can be determined (e.g., by a media player application) from the multimedia file itself, and thus no additional files are required to generate such a preview. That is, a separate preview file need not be created and maintained. Rather, a linked preview of a multimedia file can be dynamically generated from the multimedia file (e.g., through reading of the associated "tag" information that designates the preview frames of content).

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 7:
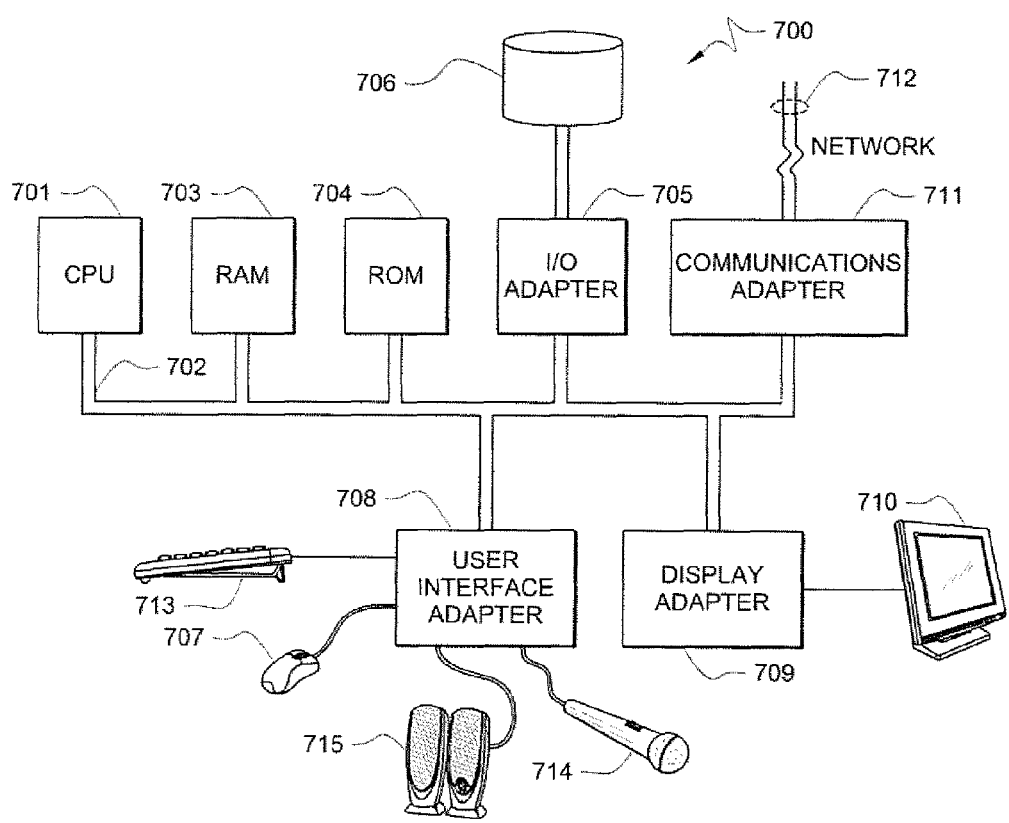
FIG. 7 shows an exemplary computer system on which embodiments of the present invention may be implemented.

FIG. 7 illustrates an exemplary computer system 700 on which embodiments of the present invention may be implemented. For instance, exemplary system 100 of FIG. 1, system 200 of FIG. 2, and/or system 500 of FIG. 5 discussed above may be implemented on exemplary computer system 700 according to certain embodiments of the present invention. Central processing unit (CPU) 701 is coupled to system bus 702. CPU 701 may be any general-purpose CPU. The present invention is not restricted by the architecture of CPU 701 (or other components of exemplary system 700) as long as CPU 701 (and other components of system 700) supports the inventive operations as described herein. CPU 701 may execute the various logical instructions according to embodiments of the present invention. For example, CPU 701 may execute machine-level instructions according to the exemplary operational flows described above in conjunction with FIGS. 3-4 and 6.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information, such as inputting a request to be presented a preview of a multimedia file (e.g., via interface 112 of FIG. 1) and/or inputting information specifying which frames of a multimedia file are to be included as preview content (e.g., via interface 212 of editing tool 201 of FIG. 2), as described above.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for operations of the media player application 101 (of FIG. 1) and/or editing tool 201 (of FIG. 2). Communications adapter 711 is preferably adapted to couple computer system 1000 to network 1012, which may enable information to be input to and/or output from system 700 via such network 712 (e.g., the Internet or other wide-area network, a local-area network, a public or private switched telephony network, a wireless network, any combination of the foregoing). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display a multimedia file's content, according to certain embodiments of the present invention.

It shall be appreciated that the present invention is not limited to the architecture of system 700. For example, any suitable processor-based device may be utilized for implementing embodiments of the present invention, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method comprising:
   determining, by a processor, selected frames of content of a multimedia file to form a preview of the multimedia file, the selected frames comprising a first portion of the content and a second portion of the content different from and noncontiguous with the first portion; and
   embedding, by the processor, information within the multimedia file that identifies the selected frames of content as the preview of the multimedia file, wherein the embedded information identifies a respective start frame for each of the first portion of the preview content and the second portion of the preview content and identifies a respective number of additional frames for each of the first portion of the preview content and the second portion of the preview content, wherein embedding the information that identifies the respective start frame and the respective number of additional frames for each of the first portion of the preview content and the second portion of the review content comprises:
      inserting a start tag in the frame header of a start frame for the respective portion of the preview content, and inserting an end tag in an additional frame header of an end frame for the respective portion of the preview content;

wherein the respective portion of the preview content comprises the start frame having the start tag inserted in the frame header, the end frame having the end tag inserted in the additional frame header, and at least one intervening frame between the start frame and the end frame; and wherein the embedded information is readable by a media player application for presenting the selected frames as the preview of the multimedia file, wherein the preview comprises the first and second portions of the content presented sequentially.

2. The method of claim 1 wherein said embedding information comprises:
inserting, by the processor, tags within the multimedia file that identify the selected frames of content.

3. The method of claim 1 further comprising:
receiving, by an editing tool executed by the processor, input specifying said selected frames.

4. The method of claim 1 further comprising:
embedding, by the processor, extended play information within the multimedia file that designates a permitted number of additional frames of content beyond the selected frames as extended play content, wherein the embedded extended play information is readable by the media player application for presenting the additional frames as an extended play of said preview of the multimedia file in response to a request for extended play.

5. The method of claim 4, wherein the embedded extended play information comprises tags associated with the first and second portions of the content and specifying the permitted number of additional frames to be presented after the first and second portions of the content.

6. The method of claim 1 further comprising:
receiving said multimedia file by an editing tool executed by the processor;
performing said determining by said editing tool;
performing said embedding by said editing tool; and
outputting, by said editing tool, said multimedia file having said information that identifies the selected frames of content as preview content embedded therein.

7. The method of claim 6 wherein said determining is determined by said editing tool responsive to user input selecting said frames of content.

8. The method of claim 6 wherein said embedding further comprises: editing, by said editing tool, said multimedia file to include information identifying the selected frames of content as preview content.

9. The method of claim 1 wherein said frames of content comprise video frames.

10. The method of claim 1 wherein said frames of content comprise audio frames.

11. The method of claim 1, wherein the preview identifies the multimedia file as content of interest.

12. The method of claim 1, wherein the at least one intervening frame does not include a tag identifying the at least one intervening frame as included in the preview content.

13. A system comprising:
a processor;
a non-transitory computer-readable medium accessible by the processor;
wherein the processor is configured to execute one or more instructions embodied in the non-transitory computer-readable medium comprising:

a user interface for receiving a selection of frames of content of a multimedia file to be designated as preview content for previewing the multimedia file, the selected frames comprising a first portion of the content and a second portion of the content different from and noncontiguous with the first portion; and logic for embedding information within the multimedia file that designates the selected frames of content as the preview content of the multimedia file, wherein embedding the information that identifies the respective start frame and the respective number of additional frames for each of the first portion of the preview content and the second portion of the preview content comprises:
inserting a start tag in the frame header of a start frame for the respective portion of the preview content, and
inserting an end tag in an additional frame header of an end frame for the respective portion of the preview content;
wherein the respective portion of the preview content comprises the start frame having the start tag inserted in the frame header, the end frame having the end tag inserted in the additional frame header, and at least one intervening frame between the start frame and the end frame, wherein the embedded information identifies a respective start frame for each of the first portion of the preview content and the second portion of the preview content and identifies a respective number of additional frames for each of the first portion of the preview content and the second portion of the preview content.

14. The system of claim 13 wherein the embedded information is readable by a media player application for presenting the selected frames of content as a preview of the multimedia file, wherein the preview comprises the first and second portions of the content presented sequentially.

15. The system of claim 13 wherein said logic is operable to edit the multimedia file to include information therein that designates the selected frames of content as preview content.

16. The system of claim 13 wherein said logic is operable to insert tags within the multimedia file that designate the selected frames of content as preview content.

17. The system of claim 13 wherein said user interface and said logic are included in a multimedia file editing tool.

18. The system of claim 13 further comprising:
logic for embedding extended play information within the multimedia file that designates a permitted number of additional frames of content beyond the preview content as extended play content to result in identifiable extended play preview content within the multimedia file.

19. The system of claim 18 wherein the embedded extended play information is readable by a media player application for presenting the additional frames as an extended play of said preview of the multimedia file in response to a request for extended play.

20. The system of claim 13 further comprising:
outputting, by said logic, said multimedia file having said information that designates the selected frames of content as preview content embedded therein.

21. A method comprising:
receiving, at a media player executed by a processor, a multimedia file that comprises embedded information that identifies frames of content of the multimedia file as preview content, said preview content comprising a first portion of the content and a second portion of the content different from and noncontiguous with the first portion, wherein the embedded information identifies a respective start frame for each of the first portion of the preview content and the second portion of the preview content and identifies a respective number of additional frames for each of the first portion of the preview content and the second portion of the preview content, wherein the embedded information is embedded by:
inserting a start tag in the frame header of a start frame for the respective portion of the preview content, and
inserting an end tag in an additional frame header of an end frame for the respective portion of the preview content;
wherein the respective portion of the preview content comprises the start frame having the start tag inserted in the frame header, the end frame having the end tag inserted in the additional frame header, and at least one intervening frame between the start frame and the end frame;
identifying, by the media player, based on said embedded information, said preview content; and
playing, by the media player, said identified preview content as a preview of the multimedia file, wherein the preview comprises the first and second portions of the content presented sequentially.

22. The method of claim 21 wherein said media player comprises a software application stored to computer-readable medium, which when executed by a computer causes the computer to perform said receiving, identifying, and playing.

23. The method of claim 21 wherein said embedded information is information contained within said multimedia file that identifies the preview content.

24. The method of claim 21 wherein said embedded information comprises tags contained within said multimedia file that identify the preview content.

25. The method of claim 24, wherein determining, by the media player, the additional frames of the multimedia file for extended play comprises presenting a number of additional frames of the multimedia file corresponding to a predefined amount of time in response to detecting, by the media player, a request for extended play.

26. The method of claim 21 further comprising:
during said playing, detecting by the media player, a request for extended play beyond the preview content;
determining, by the media player, additional frames of the multimedia file for extended play; and
playing, by the media player, the determined additional frames for extended play of the preview of the multimedia file.

27. The method of claim 26 further comprising:
after playing said determined additional frames, resuming playing, by the media player, of any remaining identified preview content.

28. The method of claim 21 further comprising:
detecting, by the media player, a request for extended play beyond a first group of contiguous preview frames;
determining, by the media player, additional frames of the multimedia file for extended play beyond said first group of contiguous preview frames;
playing, by the media player, the first group of contiguous preview frames and the determined additional frames appended thereto; and
after playing the first group of contiguous preview frames and the determined additional frames appended thereto, playing, by the media player, a next contiguous group of preview frames.

29. A system comprising:
a processor for executing instructions stored in computer-readable medium on one or more devices providing an application;
wherein the application comprises one or more modules configured to perform operations comprising:
reading a multimedia file that comprises embedded information that identifies frames of content of the multimedia file as preview content, said preview content comprising a first portion of the content and a second portion of the content different from and noncontiguous with the first portion, wherein the embedded information identifies a respective start frame for each of the first portion of the preview content and the second portion of the preview content and identifies a respective number of additional frames for each of the first portion of the preview content and the second portion of the preview content, wherein the embedded information is embedded by:
inserting a start tag in the frame header of a start frame for the respective portion of the preview content, and
inserting an end tag in an additional frame header of an end frame for the respective portion of the preview content;
wherein the respective portion of the preview content comprises the start frame having the start tag inserted in the frame header, the end frame having the end tag inserted in the additional frame header, and at least one intervening frame between the start frame and the end frame;
identifying, based on said embedded information, said preview content; and
playing said identified preview content as a preview of the multimedia file, wherein the preview comprises the first and second portions of the content presented sequentially.

30. The system of claim 29 wherein said embedded information is contained within said multimedia file.

31. The system of claim 29 wherein the application comprises one or more modules configured to perform operations further comprising:
detecting a request for extended play beyond a first group of contiguous preview frames;
determining additional frames of the multimedia file for extended play beyond said first group of contiguous preview frames;
playing the first group of contiguous preview frames and the determined additional frames appended thereto; and
playing, after playing the first group of contiguous preview frames and the determined additional frames appended thereto, a next contiguous group of preview frames.

32. A non-transitory computer-readable medium storing program code executed by a processor, the non-transitory computer-readable medium storing:
program code for determining selected frames of content of a multimedia file to form a preview of the multimedia file, the selected flames comprising a first portion of the content and a second portion of the content different from and noncontiguous with the first portion; and
program code for embedding information within the multimedia file that identifies the selected flames of content as the preview of the multimedia file, wherein the embedded information identifies a respective start flame for each of the first portion of the preview content and the second portion of the preview content and identifies a respective number of additional frames for each of the first portion of the preview content and the second portion of the preview content, wherein embedding the information that identifies the respective start flame and the respective number of additional frames for each of the first portion of the preview content and the second portion of the preview content comprises:

inserting a start tag in the flame header of a start flame for the respective portion of the preview content, and inserting an end tag in an additional frame header of an end flame for the respective portion of the preview content; wherein the respective portion of the preview content comprises the start flame having the start tag inserted in the flame header, the end frame having the end tag inserted in the additional frame header, and at least one intervening frame between the start frame and the end frame; and wherein the embedded information is readable by a media player application for presenting the selected frames as the preview of the multimedia file, wherein the preview comprises the first and second portions of the content presented sequentially.

\* \* \* \* \*